US008715832B2

(12) United States Patent
Ederer et al.

(10) Patent No.: US 8,715,832 B2
(45) Date of Patent: May 6, 2014

(54) METHOD FOR THE LAYERED CONSTRUCTION OF PLASTIC MODELS

(75) Inventors: Ingo Ederer, Geltendorf (DE); Johannes Gunther, Augsburg (DE); Daniel Gunther, Munich (DE); Ingo Gnuchtel, Merching (DE)

(73) Assignee: Voxeljet AG, Friedberg (DE)

( * ) Notice: Subject to any disclaimer, the term of this patent is extended or adjusted under 35 U.S.C. 154(b) by 253 days.

(21) Appl. No.: 13/129,443

(22) PCT Filed: Nov. 2, 2009

(86) PCT No.: PCT/DE2009/001528
§ 371 (c)(1),
(2), (4) Date: May 16, 2011

(87) PCT Pub. No.: WO2010/057457
PCT Pub. Date: May 27, 2010

(65) Prior Publication Data
US 2011/0223437 A1 Sep. 15, 2011

(30) Foreign Application Priority Data

Nov. 20, 2008 (DE) .................. 10 2008 058 378

(51) Int. Cl.
B32B 9/04 (2006.01)
B32B 5/16 (2006.01)
B32B 27/00 (2006.01)
B05D 3/00 (2006.01)

(52) U.S. Cl.
USPC ........ 428/500; 428/411.1; 428/327; 427/189; 427/195

(58) Field of Classification Search
None
See application file for complete search history.

(56) References Cited

U.S. PATENT DOCUMENTS

| | | |
|---|---|---|
| 4,247,508 A | 1/1981 | Housholder |
| 4,352,723 A | 10/1982 | Morgan |
| 4,369,025 A | 1/1983 | Von der Weid |
| 4,575,330 A | 3/1986 | Hull |
| 4,665,492 A | 5/1987 | Masters |
| 4,752,352 A | 6/1988 | Feygin |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,248,456 A | 9/1993 | Evans, Jr. et al. |
| 5,252,264 A | 10/1993 | Forderhase et al. |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,482,659 A | 1/1996 | Sauerhoefer |
| 5,490,962 A | 2/1996 | Cima et al. |
| 5,506,607 A | 4/1996 | Sanders, Jr. et al. |
| 5,555,176 A | 9/1996 | Menhennett et al. |
| 5,573,055 A | 11/1996 | Melling et al. |

(Continued)

FOREIGN PATENT DOCUMENTS

| | | |
|---|---|---|
| AU | 720255 B2 | 5/2000 |
| DE | 4300478 | 8/1994 |
| DE | 4400523 | 7/1995 |
| DE | 4440397 | 9/1995 |
| DE | 19511772 A1 | 10/1996 |
| DE | 19545167 A1 | 6/1997 |
| DE | 19723892 C1 | 9/1998 |
| DE | 19846478 C2 | 4/2000 |
| DE | 19853834 | 5/2000 |
| DE | 10047614 | 4/2002 |

(Continued)

OTHER PUBLICATIONS

Cima et al., "Computer-derived Microstructures by 3D Printing: Bio-and Structural Materials," SFF Symposium, Austin, TX, 1994.
EOS Operating Manual for Laser Sintering Machine, Part 1 with Brief Summary, Feb. 22, 2005.
EOS Operating Manual for Laser Sintering Machine, Part 2 with Brief Summary, Feb. 22, 2005.
Sachs et al., "Three-Dimensional Printing: Rapid Tooling and Prototypes Directly from a CAD Model", Massachusetts Institute of Technology, pp. 131-136, Jan. 1990.

(Continued)

Primary Examiner — Sheeba Ahmed
(74) Attorney, Agent, or Firm — The Dobrusin Law Firm, P.C.

(57) ABSTRACT

The invention relates to a method for implementing layered construction of plastic models, whereby a first material is applied to a building platform and thereupon a second material is selectively applied and these two application steps are respectively repeated layer after layer until the desired model is obtained. The two materials form a solid body when a suitable mixture ratio is used. The first material includes a particle material and the second material is applied via a print head and contains N-vinylformamide.

20 Claims, No Drawings

(56) References Cited

U.S. PATENT DOCUMENTS

| | | |
|---|---|---|
| 5,597,589 A | 1/1997 | Deckard |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,730,925 A | 3/1998 | Mattes et al. |
| 5,740,051 A | 4/1998 | Sanders, Jr. et al. |
| 5,753,274 A | 5/1998 | Wilkening et al. |
| 5,807,437 A | 9/1998 | Sachs et al. |
| 5,851,465 A | 12/1998 | Bredt |
| 5,902,441 A | 5/1999 | Bredt et al. |
| 5,902,537 A | 5/1999 | Almquist et al. |
| 5,943,235 A | 8/1999 | Earl et al. |
| 5,989,476 A | 11/1999 | Lockard et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,116,517 A | 9/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,165,406 A | 12/2000 | Jang et al. |
| 6,193,922 B1 | 2/2001 | Ederer |
| 6,217,816 B1 | 4/2001 | Tang |
| 6,259,962 B1 | 7/2001 | Gothait |
| 6,305,769 B1 | 10/2001 | Thayer et al. |
| 6,322,728 B1 | 11/2001 | Brodkin et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van der Geest |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,467,525 B2 | 10/2002 | Herreid et al. |
| 6,476,122 B1 | 11/2002 | Leyden |
| 6,500,378 B1 | 12/2002 | Smith |
| 6,554,600 B1 | 4/2003 | Hofmann et al. |
| 6,610,429 B2 | 8/2003 | Bredt et al. |
| 6,713,125 B1 | 3/2004 | Sherwood et al. |
| 6,733,528 B2 | 5/2004 | Abe et al. |
| 6,838,035 B1 | 1/2005 | Ederer et al. |
| 7,004,222 B2 | 2/2006 | Ederer et al. |
| 7,137,431 B2 | 11/2006 | Ederer et al. |
| 2001/0050031 A1 | 12/2001 | Bredt et al. |
| 2002/0026982 A1 | 3/2002 | Bredt et al. |
| 2002/0111707 A1 | 8/2002 | Li et al. |
| 2003/0083771 A1 | 5/2003 | Schmidt |
| 2004/0012112 A1 | 1/2004 | Davidson et al. |
| 2004/0035542 A1 | 2/2004 | Ederer et al. |
| 2004/0038009 A1 | 2/2004 | Leyden et al. |
| 2004/0056378 A1 | 3/2004 | Bredt et al. |
| 2004/0094058 A1 | 5/2004 | Kasperchik et al. |
| 2004/0145088 A1 | 7/2004 | Patel et al. |
| 2005/0017394 A1* | 1/2005 | Hochsmann et al. ......... 264/113 |
| 2005/0093194 A1 | 5/2005 | Oriakhi et al. |
| 2005/0167872 A1 | 8/2005 | Tsubaki et al. |
| 2005/0283136 A1 | 12/2005 | Skarda |
| 2006/0208388 A1 | 9/2006 | Bredt et al. |
| 2007/0045891 A1 | 3/2007 | Martinoni |
| 2008/0001331 A1 | 1/2008 | Ederer |
| 2010/0026743 A1* | 2/2010 | Van Thillo et al. ................ 347/9 |

FOREIGN PATENT DOCUMENTS

| | | |
|---|---|---|
| DE | 69706374 T2 | 5/2002 |
| DE | 60008778 T2 | 2/2005 |
| DE | 69634921 T2 | 12/2005 |
| DE | 10 2006 040305 A1 | 3/2007 |
| EP | 0361847 B1 | 4/1990 |
| EP | 0431924 B1 | 6/1991 |
| EP | 0688262 | 12/1995 |
| EP | 0711213 | 5/1996 |
| EP | 0734842 | 10/1996 |
| EP | 0739666 | 10/1996 |
| EP | 0968776 | 1/2000 |
| EP | 1163999 | 12/2001 |
| EP | 1415792 | 5/2004 |
| EP | 1442870 | 8/2004 |
| EP | 1935652 A1 | 6/2008 |
| FR | 2790418 | 9/2000 |
| GB | 2382798 | 6/2003 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |
| WO | 01/26885 A1 | 4/2001 |
| WO | 01/72502 A1 | 4/2001 |
| WO | 01/34371 A2 | 5/2001 |
| WO | 02/226419 A1 | 4/2002 |
| WO | 02/226420 A1 | 4/2002 |
| WO | 02/226478 A1 | 4/2002 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 03/103932 A1 | 12/2003 |
| WO | 2004/010907 A1 | 2/2004 |
| WO | 2004/110719 A2 | 12/2004 |
| WO | 2004/112988 A2 | 12/2004 |
| WO | 2005/082603 A1 | 9/2005 |
| WO | 2005/113219 A1 | 12/2005 |

OTHER PUBLICATIONS

Sachs et al,, "Three-Dimensional Printing: Rapid Tooling and Prototypes Directly from a CAD Model", Massachusetts Institute of Technology, pp. 143 & 151, Jan. 1990.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal, Apr. 2000.
Williams, "Feasibility Study of Investment Casting Pattern Design by Means of Three Dimensional Printing", Department of Mechanical Engineering, pp. 2-15, Jun. 1987.
Copending National Phase Application, WO 02/26419, Apr. 4, 2002.
Copending National Phase Application, WO 02/26420, Apr. 4, 2002.
Copending Patent Application, U.S. Appl. No. 11/320,050 (corresponds with PCT WO 02/26420), (US Patent No. 7,137,431),Dec. 28, 2005.
Copending National Phase Application, WO 03/103932, Dec. 18, 2003.
Copending National Phase Application, WO 04/112988, Dec. 8, 2005.
Copending National Phase Application, WO 05/113219, Dec. 1, 2005.
Copending Patent Application, U.S. Appl. No. 11/767,778, filed Jun. 25, 2007 (Published as 2008-0001331), Jun. 25, 2007.
Copending U.S. Appl. No. 10/866,205, (Published as 2005/0017394), Jun. 11, 2004.
International Search Report, WO 04/110719, Jan. 11, 2005.
International Search Report, WO 2005-113219, Dec. 1, 2005.
Gebhardt, Rapid Prototyping, pp. 118-119, 1996.
Marcus et al., Solid Freeform Fabrication Proceedings, Nov. 1993.
Opposition of Patent No. DE10047614, Jun. 25, 2003.
Opposition to European Patent No. 1322458 B1, Jan. 19, 2005.
International Search Report, PCT/DE00/03324, (Published as WO2002/026419), Jun. 5, 2001.
International Search Report, PCT/DE01/03661 (Published as WO2002/026420), Feb. 28, 2002.
International Search Report, PCT/DE01/03662 (Published as WO2002/026478), Mar. 1, 2002.
International Search Report, PCT/DE2009/001528, (Published as WO2010/057457), English Translation May 25, 2011.
Marcus, et al., Solid Freeform Fabrication Proceedings, Sep. 1995, p. 130-133.
US 4,937,420, 06/1990, Deckard (withdrawn)

* cited by examiner

METHOD FOR THE LAYERED CONSTRUCTION OF PLASTIC MODELS

CROSS-REFERENCE TO RELATED APPLICATIONS

Claim of Benefit of Filing Date

The present application claims the benefit of the filing date of PCT Application Serial No. PCT/DE2009/001528 (filed Nov. 2, 2009) (Published as WO 2010/057457) and DE 10 2008 058 378.2 (filed Nov. 20, 2008), the contents of which are hereby incorporated by reference in their entirety

STATEMENT REGARDING FEDERALLY SPONSORED RESEARCH OR DEVELOPMENT

Not Applicable

INCORPORATION BY-REFERENCE OF MATERIAL SUBMITTED ON A COMPACT DISC

Not Applicable.

BACKGROUND OF THE INVENTION

Generative methods for manufacturing 3D structures, particularly those made of plastic, have been known for some time. These methods include, for example, methods such as stereolithography, by which a liquid medium containing monomers is bonded using a high energy beam. Furthermore, selective laser sintering (SLS) is known, by which the particle material is melted with a high energy beam. In addition, the 3D printing process is known from the prior art and is also designated as rapid prototyping All these known methods permit a comparatively economical manufacture of moulds for prototype construction.

If a 3D printing process uses printing devices with multiple controllable jets, this method is superior to all others since much higher build speeds can be achieved. With such a process, the application is not only limited to the prototype area, rather even mass-produced components can be created economically.

Furthermore, still other methods are known from the prior art. For example, there are systems that operate completely upon a liquid medium basis, and systems that use powder mate which are selectively bonded by rrieans of input of liquid media.

Liquid-based systems of the prior art are, for example, known from U.S. Pat. No. 6,259,962 by the Objet Geometries Ltd. company. This method is based therein that upon bonding two various materials are generated. After the printing process, the models created by applied layers can then be released from any backing material by means of a dissolution method, for example a water bath.

The bonding of the printing materials, which are initially liquid, can be performed by ultra-violet radiation, for example. In addition, twin or multi-component systems can be used by which these are applied together to the building platform and bonded. Since the complete building volume must be created using an ink-jet printer, this method is comparatively slow and therefore only suitable for smaller components.

BRIEF SUMMARY OF THE INVENTION

In terms of time intensity, a considerably more economical alternative is plastic model layered construction that utilises particle material. In this method, a powdered material is selectively bonded. A coating device is used to apply and smooth thin layers of the particle material on a workpiece platform. Using computer component data, a print head bonds selective areas on the powder layer. This process repeats itself over and over until the component is completed and can be removed from the non-solidified particle material.

One benefit derived herefrom is that a portion of the component material is already provided by the volume of particle material. Thus the quantity that must be added as a liquid medium via a printer is comparatively low. In this manner, this method allows high print head speeds, short layer times and a—comparatively—simple print head design.

The type of bonding of the liquid material is determined by means of the materials system, that is, the combination of powder and added liquid medium.

There are generally two systems conceivable:
1. The liquid bonds with one of the components contained in the powder or
2. The powder is passive and the liquid medium cures, for example, by means of additional or external components, such as radiation.

The systems aforementioned in 2, can be further subdivided as follows:
crystallisation systems (inorganic systems)
polymerising systems (organic materials)
solvent systems In inorganic systems, for example, liquid water glass (sodium silicate) can be added to the particle material and hardened through a second component e.g. $CO_2$. Many materials can conceivably be used as the "base powder" or particle material, for example sand ($SiO_2$), corundum, zirconium and a highly diverse array of other technical ceramics. In addition, glass balls, plaster, pyrogenic silicic acid, cement or even metals can be bonded. The added liquid medium, namely binder liquid, is by no means limited to water glass.

In the case of polymerising systems, the applied liquid can be carried out as a single or multi-component system. In single component systems, an external bonding initiator must be present in order to achieve the liquid/solid phase transition. In most cases, the printed layer is exposed to ultra-violet radiation. Suitable base fluids include radically polymerising monomers with ultra-violet initiators, epoxy resins, urethanes and other systems that can be initiated with external excitation.

When using multiple separate fluids, multi-component materials can be used. Such materials bond by means of a chemical reaction during convergence in the build space, for example. Possibilities include numerous reactive systems whose initial component separation enables long-term use in the building process.

If solvent systems are employed, these bond via evaporation of the solvent while forming a sustainable layer of the dissolved material. Numerous combinations of materials can be used for this purpose.

The systems that include powder components in the bonding process can likewise be further subdivided;
recrystallisation
solvent-based adhesive
multi-component polymerisation system In this manner, powdered inorganic substances can be dissolved by use of suitable solvents. Regeneration of a crystal takes place after solvent evaporation. This effect can be put to use in that coarse granules can be bonded to their contact points by deliberately limiting the quantity of added liquid. Such systems are used, for example, by the company Z-Corp. See also e.g. DE 697 06 374 12 or U.S. Pat. No. 6,902,441.

A similar effect can be achieved in organic systems. Dissolution of polymers applied as particle material and subsequent resolidification via evaporation can likewise be used to bind comparatively coarse particles to each other.

A comparatively simple printing fluid can be used with polymerising systems that contain a component in the powder. For this purpose, the components in the powder can either be a solid coating or a liquid encapsulation. In addition, they can also be located in the powder grains. In all described variants, the liquid bonds the particle material after printing. Depending on the characteristics of the system, the bonding represents a certain loss of time.

The suitability of a liquid system for use in a 3D printing system with a reactive particle material is determined by the following solvent properties: solvent property, viscosity, vapour pressure, polymerisation shrinkage and/or polymerisation conversion.

Depending on the type of particle material employed, the printing fluid must be able to dissolve the particles in order to release a second component and thereby start the bonding reaction. The viscosity of the liquid must be suitable both for the process described herein as well as for printing with an ink jet printer head.

Depending on the size and shape of the component, it takes a certain amount of time until another particle layer is applied. It is important at this point that not too much of the added liquid is lost due to evaporation, otherwise layer bonding is no longer feasible.

Polymerisation shrinkage is a crucial factor in regards to the accuracy and dimensional stability of the component. This should be kept to a minimum. Moreover, the conversion of liquid compared to polymer should be high in order to obtain solid, easy-to-handle components.

One object of the present invention is to provide a method for layered construction of plastic models that best enables meeting the preceding prerequisites. In particular, this means good solvent properties and the guarantee of best possible dimensional stability.

This object is achieved by a method for implementing layered construction of plastic models, whereby a first material is applied to a building platform and thereupon a second material is selectively applied and these two application steps are respectively repeated layer after layer until the desired model is obtained. The two materials form a solid body when a suitable mixture ratio is used. The first material comprises a particle material and the second material is applied via a print head and contains N-vinylformamide.

Furthermore this object is achieved by use of N-vinylformamide in conjunction with a method for layered construction of plastic models.

Surprisingly, it was discovered that N-vinylformamide fulfils the aforementioned characteristics in an ideal way. Up to now, N-vinylformamide has not been used for this application purpose, but has only been known as a coating material in the paper industry, whereby, up to now, it has been used for a cationic polymerisation reaction.

Due to its extremely good solvent properties, a very rapid partial dissolution of the particle material occurs. However, the dissolved material still remains dimensionally stable, which in turn leads to very good edge definition. An additional advantage is that it has been proven that N-vinylformamide exhibits no carcinogenic properties.

Moreover, according to a preferred embodiment of the invention, it may be advantageous if a PMMA-containing particle material is used as the first material.

Furthermore, according to a further preferred embodiment of the method according to the invention, an initiator and/or a crosslinking agent and/or a catalyst can be added to the particle material.

According to a preferred embodiment of the method according to the invention, it may be advantageous that N-vinylformamide is the main component of the second material.

Another possibility is that the second material additionally includes an initiator, catalyst or/and crosslinking agent.

According to a particularly preferred embodiment of the method of the present invention, N-vinylformamide is used in a layered construction process of plastic models whereby a layer of particle material is first applied on a building platform followed by a selective application of an N-vinylformamide that is applied via a print head. These two application steps are respectively repeated layer upon layer until the desired model is obtained.

According to a further embodiment of the method of the present invention, the particle material PMMA is contained thus enabling building of components that exhibit especially high dimensional stability.

According to a preferred embodiment of the invention, it has been shown to be advantageous, if—in addition to N-vinylformamide—an initiator and/or a crosslinking agent and/or a catalyst can be applied by means of a print head.

BRIEF DESCRIPTION OF THE SEVERAL VIEWS OF THE DRAWINGS.

Not Applicable

DETAILED DESCRIPTION OF THE INVENTION

For the purpose of more detailed explanation, the invention is described in further detail below on the basis of preferred embodiments, however it is in no way limited by these.

The following describes an exemplary formulation for the 3D print system according to the present invention.

For this purpose, a combination is used which includes PMMA particle material as the first material (which contains the initiator dibenzoylperoxide) and vinyl monomer N-vinylformamide as the second material.

In addition, a PMMA particle material containing dibenzoyiperoxide is applied over the whole of the surface by means of a dispensing device on a workpiece platform (as is known from other rapid prototyping methods of a prior art) and then N-vinylformamide is applied via a jet upon a predetermined area of the component being formed. Control of the jet normally proceeds by means of computer data and application often proceeds via an ink jet print head.

During such a process, bonding of the two materials does not take place via a cationic, but rather via a radical polymerisation on the double bond of the vinyl monomer. Cleavage of the initiator to act as a radical initiator for the chain reaction is triggered in the conventional manner via suitable tertiary amines, e.g. N,N-dimethyl-p-toluidine, N-N-di-(2-hydroxyethyl)-p-toluidine, N,N-dimethylaniline, N,N-diethylaniline, etc.—but is additionally catalysed using N-vinylformamide. In the case of such a formulation, it can be that the otherwise frequently used catalyst can be dispensed with.

According to a described preferred embodiment of the method of the invention, a crosslinking agent is additionally used so that minimisation of shrinkage can be achieved. Proven as particularly suited is a bifunctional acrylate—e.g. Photomer type 4025, 4028, 6210, 4172F, etc. Such a crosslinking agent additionally increases the viscosity of N-vinylformamide and can, for this reason, also be used to adjust the desired characteristics of the model being built.

Furthermore, the following products can also be used Sartomer SR 601E (comparable to Photomer 4028F), Sartomer SR 602 and Sartomer SR 349.

An acceleration of the polymerisation process can be achieved by addition of metalorganic catalysts, such as metal octoates, metal naphthenates and metal acetylacetonates including Co, Al, Zn, Zr, V, Ti, Y, Nb, Fe, Mn, Pd, Pt, Ru, Mo, Cu, Cr, Ni or Cd.

Components created with use of materials exemplarily specified herein exhibit less dimensional distortion and better edge definition as compared to materials used up to now to build plastic components. In addition, low vapour pressure prevents anisotropies of components because the low evaporation of fluid pressure (especially N-vinylformamide) enables the built-up material to polymerise, thereby considerably facilitating handling of the system.

What is claimed is:

1. A method for implementing layered construction of plastic models, whereby a first material is applied to a budding platform and thereupon a second material is selectively applied and these two application steps are repeated until the desired model is obtained, the two materials form a solid body when a suitable mixture ratio is used, the first material represents a particle material and the second material is applied via a print head and contains N-vinylformamide, wherein the N-vinylformamide is not used for a cationic polymerization reaction.

2. A method for implementing layered construction of plastic models, comprising the steps of:
   applying a first material to a building platform and
   selectively applying a second material upon the first material;
   wherein the two application steps are repeated until a desired model is obtained a mixture ratio of the first material and the second material is selected to form a solid body; the first material represents is a particle material and the second material is applied via a print head and contains N-vinylformamide;
   wherein the particle material contains a PMMA.

3. The method according to claim 1, wherein the particle material includes an initiator, a crosslinking agent, or a catalyst.

4. The method according to claim 1, wherein N-vinylformamide is the main component of the second material.

5. The method according to claim 1, wherein the second material comprises an initiator, a catalyst, or a crosslinking agent.

6. The method according to claim 2 wherein, wherein the particle material has includes an initiator, a crosslinking agent, or catalyst.

7. The method according to claim 2, wherein N-vinylformamide is the main component of the second material.

8. The method according to claim 3, wherein N-vinylformamide is the main component of the second material.

9. The method according to claim 2, wherein the second material comprises an initiator, a catalyst, or a crosslinking agent.

10. The method according to claim 3, wherein the second material comprises an initiator, a catalyst, or a crosslinking agent.

11. A plastic model comprising:
   a. more than one layers of a particle material wherein the particle material includes PMMA and
   b. more than one layers of N-vinylformamide
   wherein the particle material is applied to a building platform in layers and the N-vinylformamide is selectively applied via a print head to the particle material;
   wherein the particle material and the N-vinylformamide are applied until a desired plastic model is obtained.

12. The plastic model of claim 11, further including an initiator, a crosslinking agent, or a catalyst suitable for being can be applied by a print head.

13. The method of claim 1, wherein the includes a step of dissolving the particle material to release a component for starting a bonding reaction.

14. The method of claim 13, wherein the particle material is dissolved by the second material.

15. The method of claim 13, wherein the second material is a good solvent for the first material so that the dissolving step is characterized by rapid partial dissolution of the particle material.

16. The method of claim 1, wherein the bonding of the first and second materials takes place via a radical polymerization of a vinyl monomer.

17. The method of claim 1, wherein the process includes a step of triggering the cleavage of an initiator using a tertiary amine.

18. The method of claim 1, wherein the process includes a step of cross-linking the N-vinylformamide using a bifunctional acrylate.

19. The method of claim 2, wherein the first material includes a dibenzoyl peroxide initiator.

20. The method of claim 2, wherein the process includes a step of dissolving the particle material to release a component for starting a bonding reaction.

* * * * *

UNITED STATES PATENT AND TRADEMARK OFFICE
CERTIFICATE OF CORRECTION

PATENT NO. : 8,715,832 B2
APPLICATION NO. : 13/129443
DATED : May 6, 2014
INVENTOR(S) : Ederer et al.

Page 1 of 1

It is certified that error appears in the above-identified patent and that said Letters Patent is hereby corrected as shown below:

In the Claims

Column 5, Line 21, delete "applied to a budding platform" and insert
--applied to a building platform--

Column 5, Line 36, insert --,-- after "model is obtained"

Column 6, Line 2, delete "particle material has includes" and insert --particle material includes--

Column 6, Line 22, delete "for being can be applied" and insert --for being applied--

Signed and Sealed this
Fifth Day of August, 2014

Michelle K. Lee
*Deputy Director of the United States Patent and Trademark Office*